(12) United States Patent
Muto

(10) Patent No.: US 9,145,106 B2
(45) Date of Patent: Sep. 29, 2015

(54) WEBBING WINDING DEVICE

(75) Inventor: Koji Muto, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 710 days.

(21) Appl. No.: 13/364,744

(22) Filed: Feb. 2, 2012

(65) Prior Publication Data

US 2012/0199686 A1  Aug. 9, 2012

(30) Foreign Application Priority Data

Feb. 7, 2011 (JP) .................................. 2011-024306

(51) Int. Cl.
*B60R 22/34* (2006.01)
*B60R 22/18* (2006.01)

(52) U.S. Cl.
CPC ......... *B60R 22/34* (2013.01); *B60R 2022/1818* (2013.01); *B60R 2022/3402* (2013.01)

(58) Field of Classification Search
CPC  B60R 22/24; B60R 22/34; B60R 2022/1818; B60R 2022/1831; B60R 2022/1843; B60R 2022/3402
USPC .................. 242/377, 379, 397; 280/807, 808; 297/475–478
See application file for complete search history.

(56) References Cited

U.S. PATENT DOCUMENTS

| | | | | |
|---|---|---|---|---|
| 3,291,526 A | * | 12/1966 | Nicholas ....................... | 280/807 |
| 4,023,826 A | * | 5/1977 | Kokubo et al. ............... | 297/483 |
| 4,832,280 A | * | 5/1989 | Haland et al. ................. | 242/377 |
| 4,902,041 A | * | 2/1990 | Corbett et al. ................ | 280/807 |
| 6,328,238 B1 | * | 12/2001 | Chism .......................... | 242/171 |
| 7,566,075 B2 | * | 7/2009 | Latour et al. .................. | 280/808 |

FOREIGN PATENT DOCUMENTS

| | | |
|---|---|---|
| JP | H06-53318 | 7/1994 |
| JP | 3041981 | 7/1997 |
| WO | WO 2009123317 A2 * 10/2009 | ............. B60R 22/40 |

OTHER PUBLICATIONS

Japanese Notice of Reasons for Rejection and English translation dated Nov. 19, 2013.

* cited by examiner

*Primary Examiner* — Emmanuel M Marcelo
*Assistant Examiner* — Justin Stefanon
(74) *Attorney, Agent, or Firm* — Roberts Mlotkowski Safran & Cole P.C.

(57) ABSTRACT

In a webbing-winding device, a tension acting on a webbing is smaller when a pretensioner-mechanism is actuated than when a force-limiter mechanism is actuated, thus, projection dimensions of a first claw and a second claw can be made smaller than projection dimensions of second contact portions. A total of contact areas of first contact portions and the second contact portions with a body portion is larger than a total of contact areas of the first claw and the second claw with the body portion. Accordingly, the first claw and the second claw are caused to insert through an insertion hole from the lower side of a stay to attach. Since the projection dimensions can be made smaller, an amount of deflection of the protector can be made smaller. Therefore, the protector can be held on the stay reliably to allow the protector to be attached to the stay easily.

4 Claims, 8 Drawing Sheets

WEBBING WINDING DEVICE

CROSS-REFERENCE TO RELATED APPLICATION

This application claims priority under 35 USC 119 from Japanese Patent Application No. 2011-024306 filed Feb. 7, 2011, the disclosure of which is incorporated by reference herein.

BACKGROUND OF THE INVENTION

1. Field of the Invention

The invention relates to a webbing winding device including a protector that protects a webbing worn by an occupant of a vehicle by covering an insertion hole through which the webbing is inserted.

2. Related Art

FIG. 13 of Japanese Utility Model No. 3041981 shows a stay upper that is fixed to a frame. The stay upper includes a stay upper body having a seat belt guide hole formed by being penetrated therethrough and the seat belt guide hole with a seat belt being inserted therethrough.

A protector having a rectangular ring shape made of resin is arranged in a periphery of an opening of the seat belt guide hole. An upper side flange and a lower side flange are provided in an entire outer circumferential portion of the protector and the upper side flange and the lower side flange are each projected from the protector toward an outer side.

At a time in which a protector is attached to a stay upper, the protector is inserted into the seat belt guide hole from above the stay upper while being deflected (flexed) by a projecting amount of the lower side flange. Accordingly, the protector is held by the stay upper with the stay upper being sandwiched between the upper side flange and the lower side flange. Thus, with a seat belt being in contact with the protector, the seat belt is suppressed from coming into contact with the opening periphery of the seat belt guide hole.

If a load such as a strong tensile force is abruptly applied to the seat belt, the seal belt slides in an inner circumferential portion of the protector so that a high-load frictional force acts on the protector from the seal belt. Thus, the projecting amount (engage-amount) of the upper side flange and the lower side flange from the protector is set large to allow the stay upper to reliably hold the protector.

Therefore, at a time in which the protector is attached to the stay upper, the amount by which the protector is deflected increases, posing a problem that it is difficult to attach the protector to the stay upper.

SUMMARY OF THE INVENTION

In consideration of the above facts, The present invention is to provide a webbing winding device capable of causing an insertion portion to reliably hold a protector and allowing the protector to be easily attached to the insertion portion.

A webbing winding device in accordance with a first aspect of the present invention includes: a winding shaft that winds a webbing worn by an occupant of a vehicle by being rotated in a winding direction and that is rotated in a pulling-out direction by the webbing being pulled out; a frame that supports both ends of the winding shaft; an insertion portion provided in the frame, at which an insertion hole is formed through which the webbing extended from the winding shaft is inserted; a protector having an annular shape, which is mounted on the insertion portion after being elastically deformed, the protector covering an inner circumferential portion of the insertion hole to protect the webbing, and the webbing sliding on the protector when the webbing is wound or pulled out; a claw portion which is provided at an outer circumferential portion of the protector and which projects toward an outer side with respect to the protector, the claw portion abutting on a surface of the insertion portion at a side opposite to a winding shaft side; and a contact portion which is provided at the outer circumferential portion of the protector and which projects toward the outer side with respect to the protector, the contact portion abutting on a surface of the insertion portion at the winding shaft side; wherein an abutting area of the contact portion with the insertion portion is larger than an abutting area of the claw portion with the insertion portion.

According to the webbing winding device in accordance with the first aspect of the present invention, both ends of the winding shaft are supported by the frame and the webbing is wound by the winding shaft by the winding shaft being rotated in the winding direction. Also, with the webbing wound by the winding shaft being pulled out, the winding shaft is rotated in the pulling direction.

In the frame, insertion portion is provided. In the insertion portion, the insertion hole, through which the webbing extended from the winding shaft is inserted, is formed. Also, the annular shaped protector is mounted on the insertion portion. The protector protects the webbing by covering the inner circumferential portion of the insertion hole, and the webbing slides on the protector when the webbing is wound and pulled out.

The claw portion is provided in the outer circumferential portion of the protector and is projected toward the outer side from the protector to be in abutting contact with a surface of the insertion portion on the opposite side of the winding shaft. Accordingly, the movement of the protector to the side of the winding shaft with respect to the insertion portion is restricted by the claw.

The contact portion is provided in the outer circumferential portion of the protector. The contact portion is projected toward the outer side from the protector to be in abutting contact with a surface of the insertion portion on the winding shaft side. Accordingly, the movement of the protector to the opposite side of the winding shaft with respect to the insertion portion is restricted by the contact portion. Therefore, the protector is held on the insertion portion by the claw and the contact portion.

Incidentally, in an emergency of the vehicle, the winding shaft may be forced to rotate in the winding direction by a pretensioner mechanism provided in a webbing winding device being actuated, increasing a force of constraint of the occupant by the webbing. In this case, the webbing slides on the protector toward the side of the winding shaft so that a high-load frictional force acts on the protector by the webbing.

In an emergency of the vehicle, in addition to the above case, with the rotation of the winding shaft in the pulling direction being restricted and a force limiter mechanism provided in the webbing winding device may be actuated. In this case, energy of inertia acting on the occupant is absorbed by a torsion shaft provided inside the winding shaft being torsion deformed by a tension in the pulling direction acting on the webbing due to the energy of inertia acting on the occupant. At this time, the webbing slides on the protector toward the opposite side of the winding shaft so that a high-load frictional force acts on the protector by the webbing.

In a case when the pretensioner mechanism is actuated and a case when the force limiter mechanism is actuated are compared, a tension acting on the webbing is smaller when the pretensioner mechanism is actuated. Thus, when the webbing slides on the protector in an emergency of the vehicle, compared with a frictional force acting on the protector by the webbing sliding on the protector toward the opposite side of the winding shaft, a frictional force acting on the protector by the webbing sliding on the protector toward the side of the winding shaft becomes smaller. Accordingly, the insertion portion can be caused to hold the protector by making the projecting amount (engaging dimension) of the claw portion which restricts the movement of the protector toward the side of the winding shaft smaller than the projecting amount of the contact portion.

The contact area of the contact portion with the insertion portion is set larger than the contact area of the claw portion with the insertion portion. Accordingly, when the protector is attached to the insertion portion (the insertion hole), the claw portion having a smaller contact area with the insertion portion is caused to be inserted through the insertion hole from the side of the winding shaft of the insertion portion. At this time, the protector is elastically deformed with the projecting amount of the claw portion, however, as described above, the projecting amount of the claw portion can be made smaller and thus, the amount of deflection (flexure) of the protector can be made smaller when the protector is elastically deformed.

A webbing winding device in accordance with a second aspect of the present invention is the webbing winding device in accordance with the first aspect of the present invention, wherein the protector includes a one side wall over which one side surface in a thickness direction of the webbing extended from the winding shaft is slid and the other side wall on which the other side surface in the thickness direction of the webbing extended from the winding shaft is slid, the one side wall is arranged such that a length of the webbing extended from the winding shaft to the one side wall is shorter than the length of the webbing extended from the winding shaft to the other side wall, the claw portion includes a first claw portion provided in the one side wall and a second claw portion provided in the other side wall, and the first claw portion and the second claw portion are configured to have at least one of: a projecting dimension of the first claw portion being smaller than a projecting dimension of the second claw portion; and a width dimension of the first claw portion being smaller than a width dimension of the second claw portion.

According to the webbing winding device in accordance with the second aspect of the present invention, the protector includes the one side wall on which one side surface in the thickness direction of the webbing extended from the winding shaft is slid and other side wall on which the other side surface in the thickness direction of the webbing extended from the winding shaft is slid. The one side wall is provided with the first claw portion and the other side wall is provided with the second claw portion. Thus, when the protector is attached to the insertion portion, the second claw portion of the protector is engaged with the insertion portion and thereafter only the one side wall part is elastically deformed so that the protector can be attached to the insertion portion.

Here, the first claw portion and the second claw portion are configured to have at least one of: a projecting dimension of the first claw portion being smaller than a projecting dimension of the second claw portion; and/or a width dimension of the first claw portion being smaller than a width dimension of the second claw portion.
Therefore, the load used to deflect (flex) the one side wall can be made easier to set smaller than the load used to deflect the other side wall.

Moreover, the one side wall is arranged in such a way that the length of the webbing extended from the winding shaft to the one side wall becomes shorter than the length of the webbing extended from the winding shaft to the other side wall. Thus, the webbing extended from the winding shaft mainly slides on the one side wall. When the webbing slides on the one side wall, a pressing force acting on the protector by the webbing acts also in the outer side direction of the protector. Therefore, in the one side wall elastically deformed when the protector is attached to the insertion portion, the insertion portion can be caused to hold the protector more effectively.

A webbing winding device in accordance with a third aspect of the present invention is the webbing winding device in accordance with the first aspect or the second aspect of the present invention, further includes a notch portion provided in the one side wall, the notch portion being arranged between the claw portion and an end portion of the one side wall in a width direction to divide the contact portion.

According to the webbing winding device in accordance with the third aspect of the present invention, the notch portion is provided in the one side wall, the notch portion being arranged between the claw portion and an end portion of the one side wall in a width direction to divide the contact portion. Therefore, the one side wall of the protector can be elastically deformed more easily in a region of the notch portion.

According to a webbing winding device of the invention, as described above, an insertion portion can be caused to reliably hold a protector to allow the protector to be attached to a stay easily.

BRIEF DESCRIPTION OF THE DRAWINGS

Embodiments of the invention will be described in detail with reference to the following figures, wherein.

DETAILED DESCRIPTION OF THE INVENTION

Figure 1:
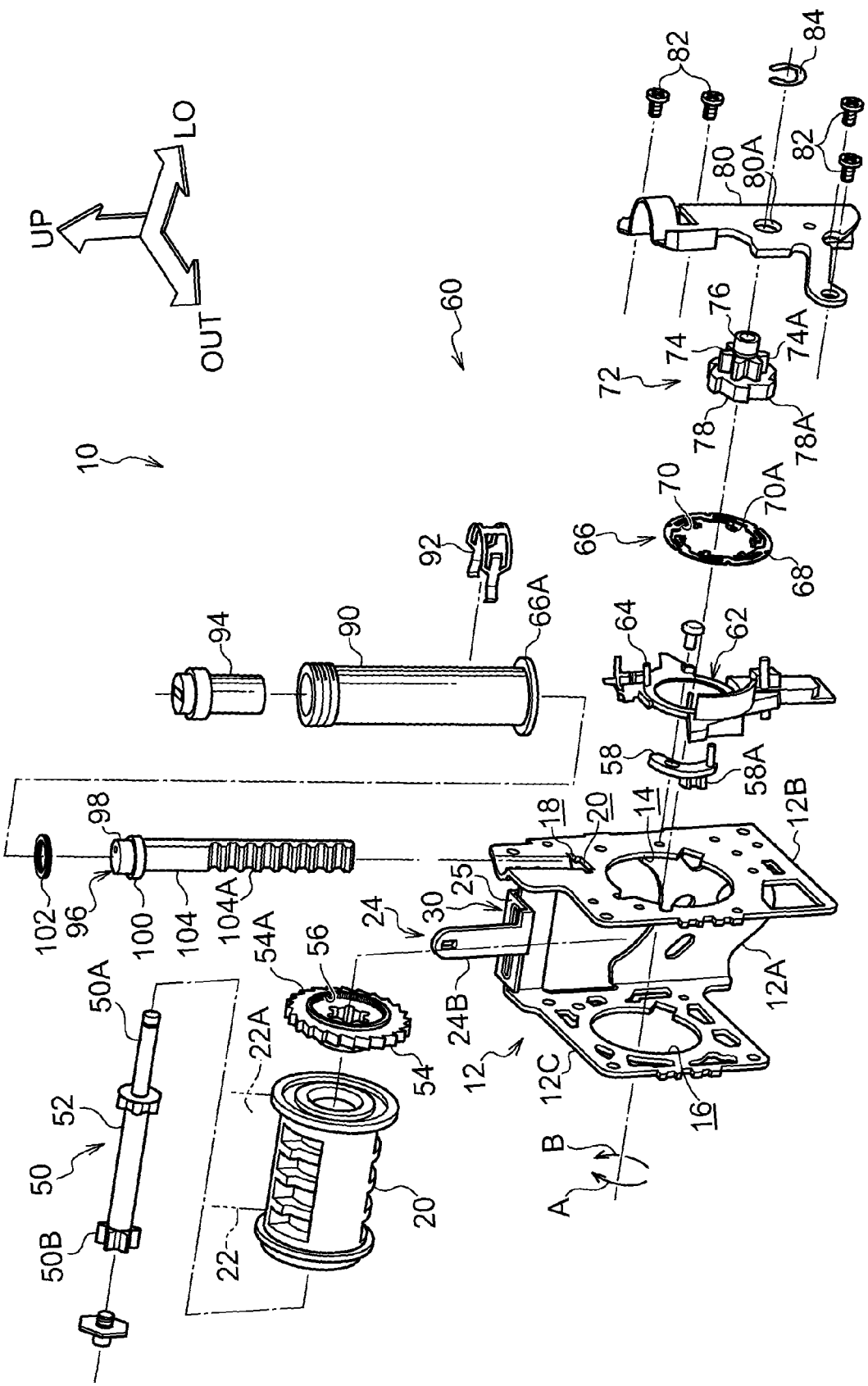
FIG. 1 is an exploded perspective view showing a webbing winding device according to an embodiment of the invention viewed from an outer side in a vehicle width direction and one side in a vehicle front and rear direction.
Figure 2:
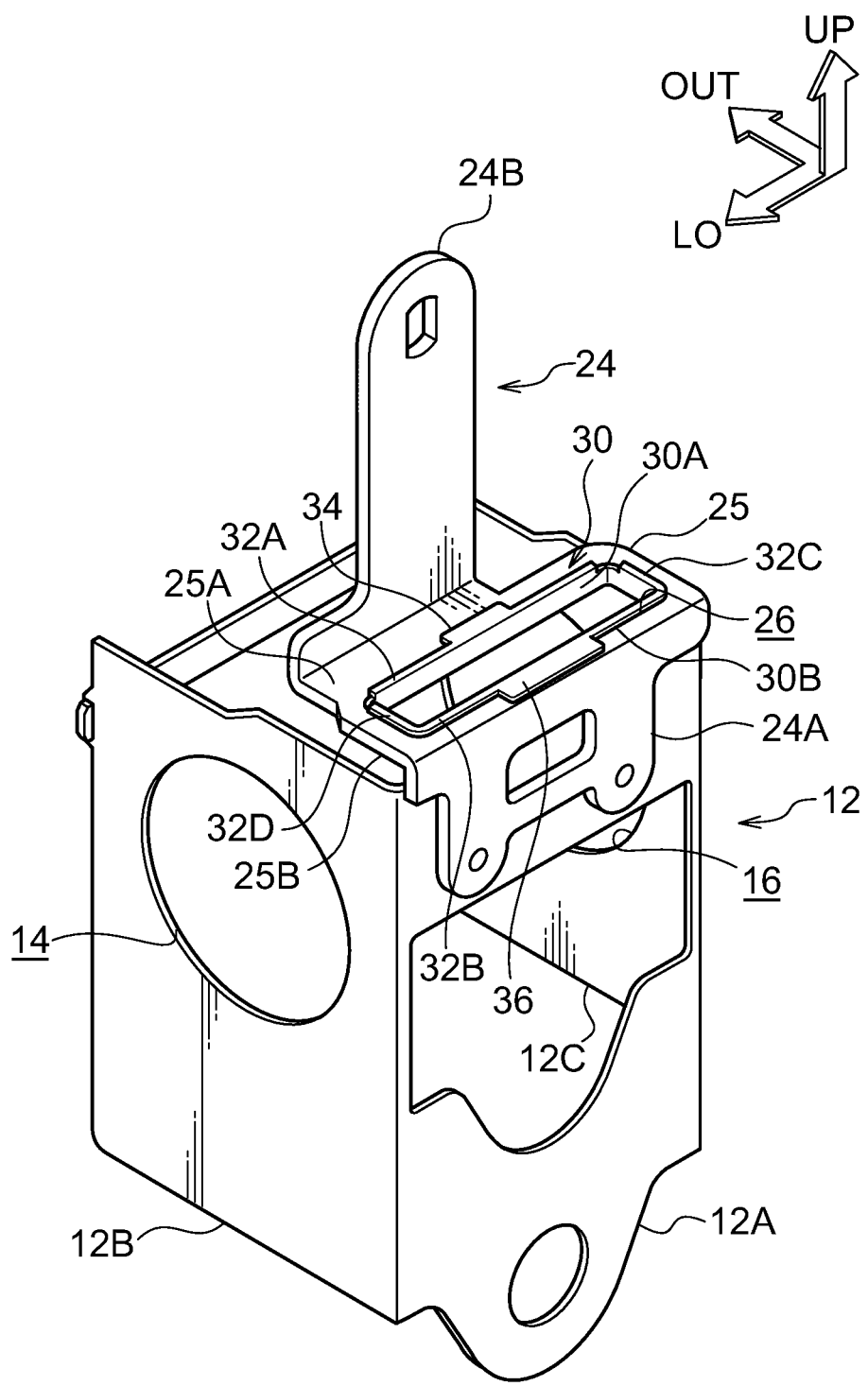
FIG. 2 is a perspective view showing a frame, a stay, and a protector used in the webbing winding device shown in FIG. 1 viewed from an inner side in the vehicle width direction and one side in the vehicle front and rear direction.
Figure 3:
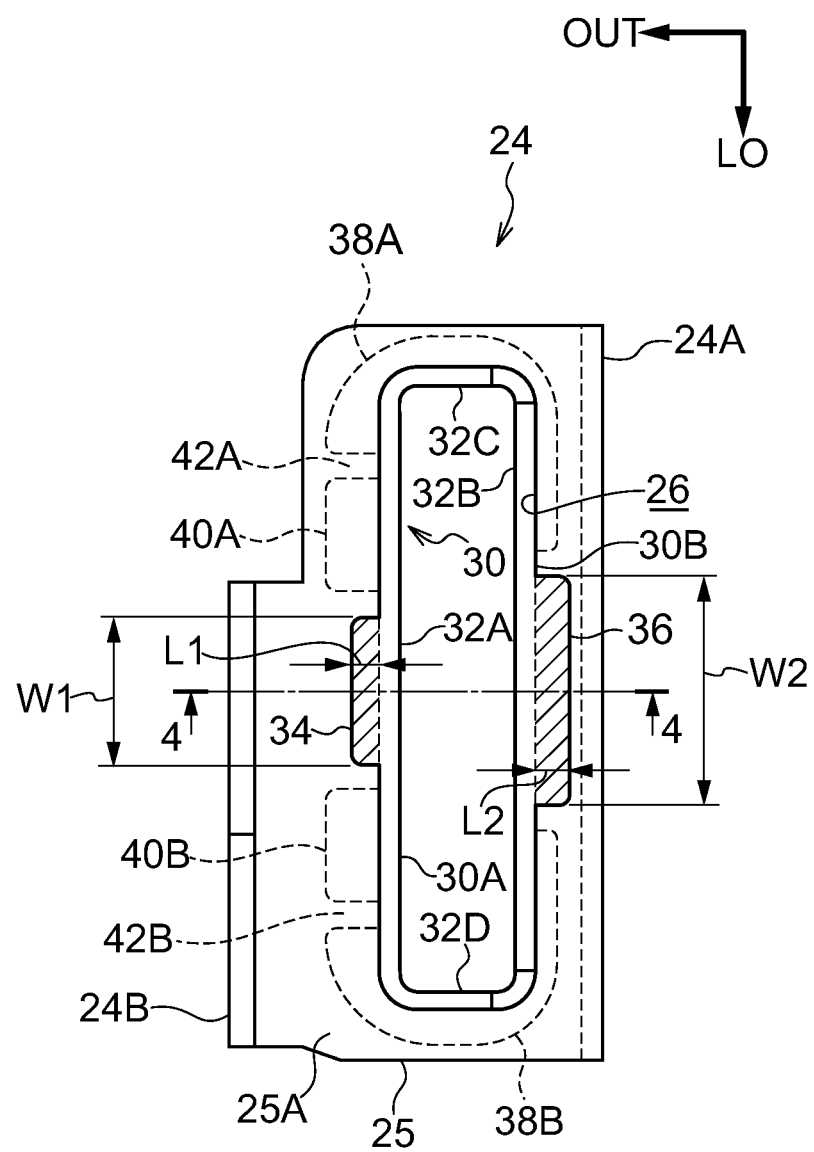
FIG. 3 is a plan view of the stay and the protector shown in FIG. 2 viewed from above.
Figure 4:
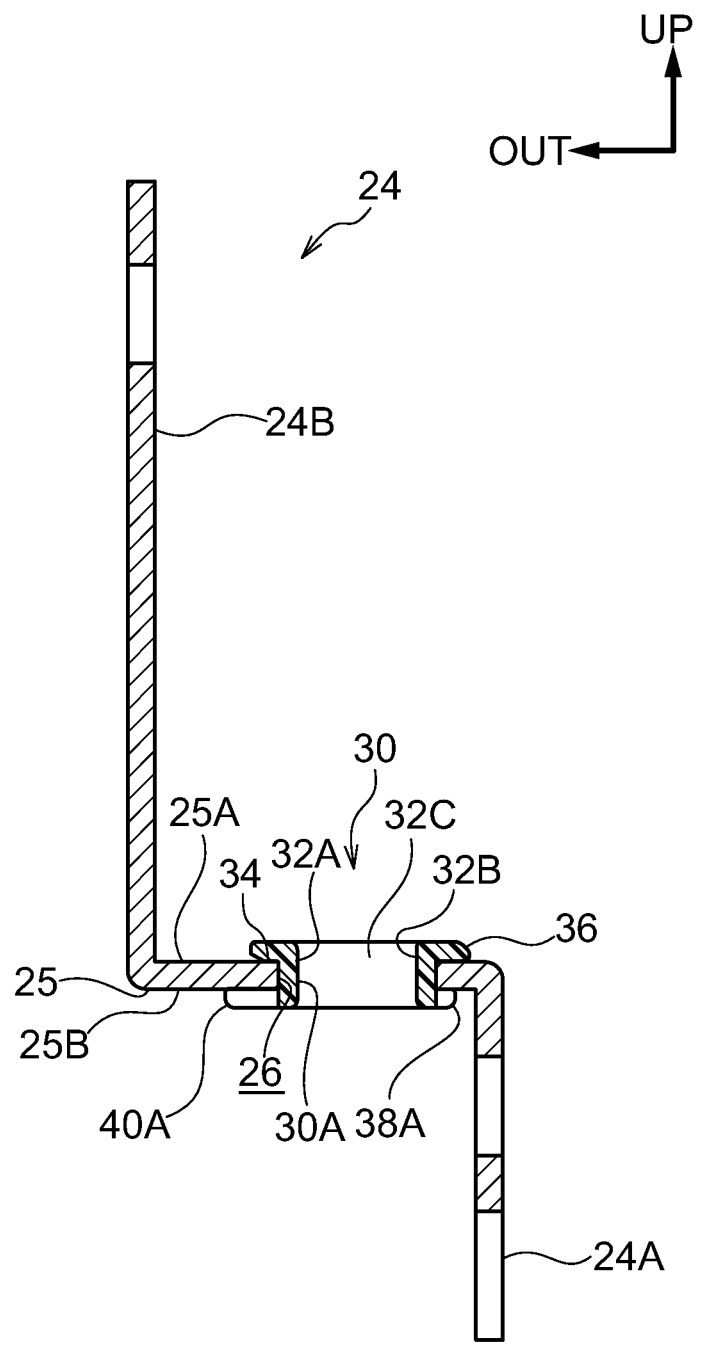
FIG. 4 is a sectional view (4-4 line sectional view in FIG. 3) of the stay and the protector shown in FIG. 3 viewed from one side in the vehicle front and rear direction.
Figure 5:
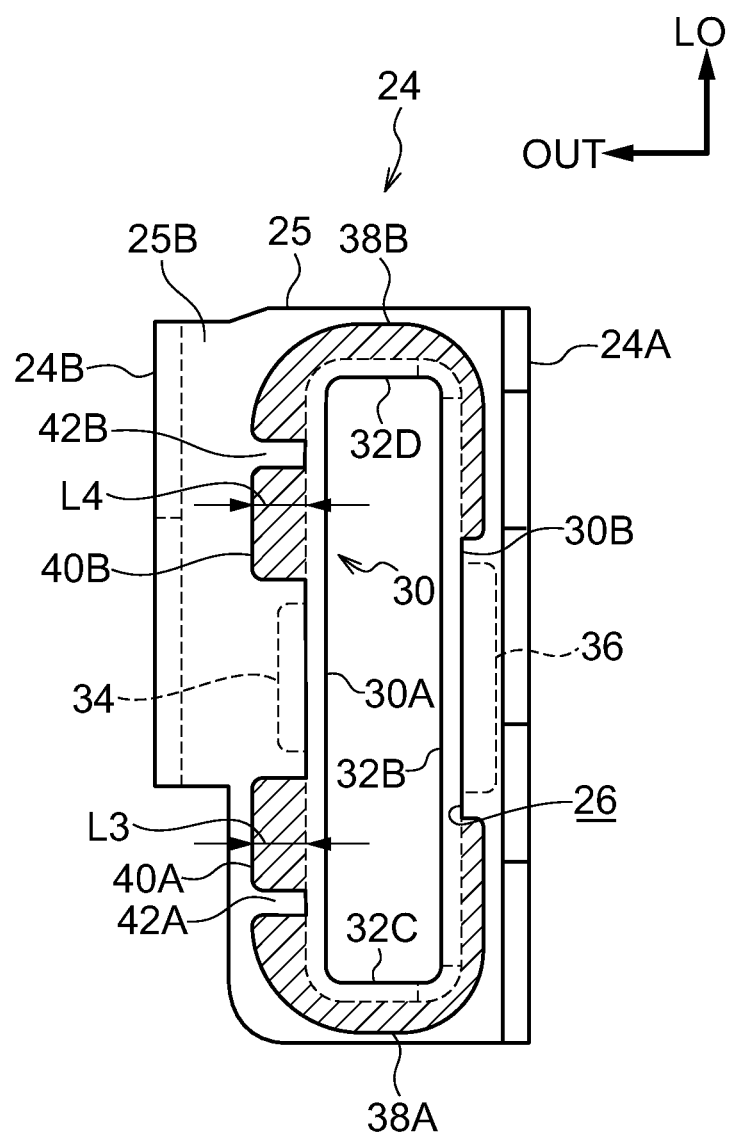
FIG. 5 is a plan view of the stay and the protector shown in FIG. 2 viewed from below.
Figure 6:
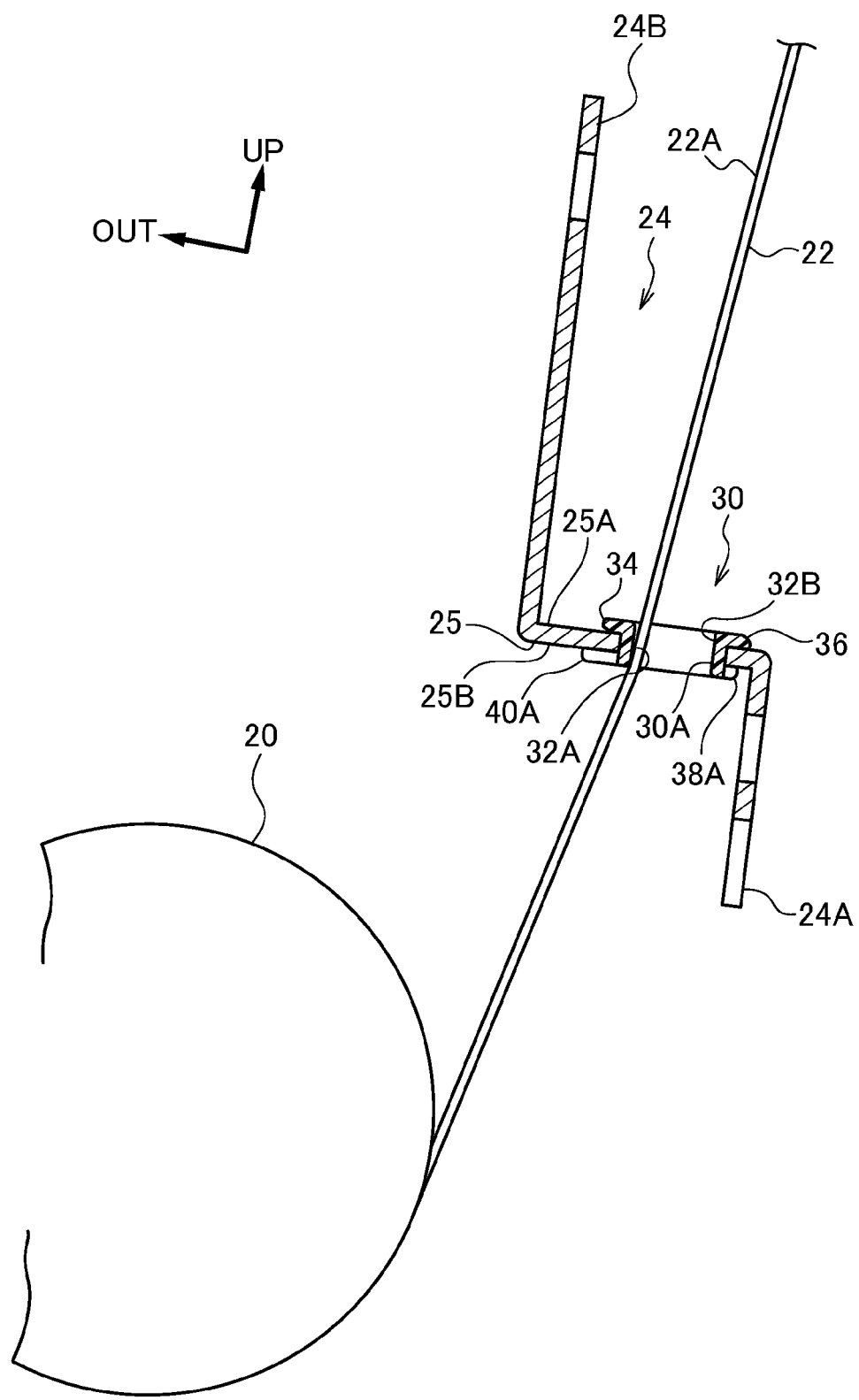
FIG. 6 is a sectional view showing when a webbing is inserted inside the protector shown in FIG. 2 viewed from one side in the vehicle front and rear direction.

In FIG. 1, a webbing winding device 10 according to an embodiment of the invention is shown as an exploded perspective view. In drawings, one side in the vehicle front and rear direction is indicated by an arrow LO, an outer side in the vehicle width direction is indicated by an arrow OUT, and an upper side is indicated by an arrow UP.

As shown in FIG. 1, the webbing winding device 10 includes a frame 12. The frame 12 is constructed from a back plate 12A in a substantially plate shape and a leg plate 12B and a leg plate 12C integrally extending from respective ends in the width direction of the back plate 12A. With the back plate 12A being fixed to a vehicle body by a fastening member (not shown in the drawings) such as bolts, the webbing winding device 10 is mounted on the vehicle body.

The leg plate 12B and the leg plate 12C have an arrangement hole 14 and an arrangement hole 16 in a round shape formed by being cut (penetrated) therethrough respectively. A spool 20 made by die casting or the like as a winding shaft is rotatably supported between the leg plate 12B and the leg plate 12C. The spool 20 as a whole has a drum shape and a base end of a webbing 22 which is formed in a long band shape is connected and fixed to the spool 20. If the spool 20 is rotated in one direction (an arrow A direction shown in FIG. 1 and hereinafter, this direction will be called a "winding direction") around a shaft (axis) line, the webbing 22 is wound around the outer circumferential portion of the spool 20 in a layered manner starting with the base end side thereof with an inner side surface 22A (one side surface in the thickness direction) of the webbing 22 being oriented to the inner side. On the other hand, if the webbing 22 is pulled from the tip side thereof, the webbing 22 is pulled out while the spool 20 is rotated in the other direction (an arrow B direction shown in FIG. 1 and hereinafter, this direction will be called a "pulling direction") around the shaft line thereof.

As shown in FIGS. 2 to 6, a stay 24, having a substantially plate shape and bent such as like a crank, as an insertion portion is provided above the spool 20. The stay 24 is constructed from a body portion 25 which is arranged substantially horizontally, a fixed portion 24A which extends downward from an end at the back plate 12A side of the body portion 25, and a mounting portion 24B which extends upward from an end at the side opposite to the back plate 12A side of the body portion 25. The fixed portion 24A is fixed to the back plate 12A and a one end portion of the mounting portion 24B is fixed to a vehicle body by a fastening member (not shown in the drawings) such as a bolt.

In the body portion 25, an insertion hole 26 having a substantially rectangular shape is formed in a center portion of the body portion 25 by the body portion 25 being cut (penetrated) therethrough, and the insertion hole 26 is arranged with the longitudinal direction thereof in parallel with the shaft line direction of the spool 20. The insertion hole 26 is arranged on the side of the back plate 12A with respect to the shaft line of the spool 20 when viewed from above, and the webbing 22 extended from the spool 20 is inserted through the insertion hole 26 and extended above from the insertion hole 26 (see FIG. 6).

A protector 30 made of resin having a substantially rectangular ring shape is mounted on the stay 24. The protector 30 is constructed from a side wall 32A as a one side wall (at the side of the mounting portion 24B) and a side wall 32B as the other side wall (at the side of the fixed portion 24A), a side wall 32C, and a side wall 32D. The size of the external shape of the protector 30 is set slightly smaller than the size of the insertion hole 26, and the protector 30 is arranged inside the insertion hole 26 so as to cover the entire inner peripheral portion of the insertion hole 26. Accordingly, the webbing 22 is inserted into the protector 30.

At a time in which the webbing 22 is wound by the spool 20, the webbing 22 moves downward (to the spool 20 side), inside the protector 30, to slide in an inner circumferential portion 30A of the protector 30. At a time in which the webbing 22 is pulled out from the spool 20, the webbing 22 moves upward (to the side opposite to the spool 20 side), inside the protector 30, to slide in the inner circumferential portion 30A of the protector 30. Accordingly, the webbing 22 does not come into contact with a peripheral edge of the insertion hole 26 and thus, the webbing 22 is protected by the protector 30.

The insertion hole 26 is arranged, as described above, on the side of the back plate 12A with respect to the shaft line of the spool 20 when viewed from above. Further, the side wall 32A is arranged in such a way that a length of the webbing 22 extended from the spool 20 to the side wall 32A becomes shorter than a length of the webbing 22 extended from the spool 20 to the side wall 32B. Accordingly, it is structured that the webbing 22 extended from the spool 20 mainly slides on the side wall 32A (see FIG. 6).

In an intermediate portion in the width direction of the side wall 32A (in the vehicle front and rear direction of the side wall 32A), a first claw 34 having a substantially rectangular plate shape as a first claw portion is integrally provided in an outer peripheral portion 30B of the protector 30. The first claw 34 is projected to the outer side from the protector 30 and arranged on the side of an upper surface 25A (the surface on the opposite side of the spool 20) of the body portion 25 of the stay 24 to be in abutting contact with the upper surface 25A.

In an intermediate portion in the width direction of the side wall 32B, a second claw 36 having a substantially rectangular plate shape as a second claw portion is integrally provided in the outer peripheral portion 30B of the protector 30. The second claw 36 is projected to the outer side from the protector 30 and arranged on the side of the upper surface 25A of the body portion 25 to be in abutting contact with the upper surface 25A. Accordingly, the downward (to the spool 20) movement of the protector 30 is restricted by the first claw 34 and the second claw 36. Further, a projection dimension (projecting dimension from the outer peripheral portion 30B of the protector 30 (from the side wall 32A) toward outside) L1 of the first claw 34 is set smaller than a projection dimension (projecting dimension from the outer peripheral portion 30B of the protector 30 (from the side wall 32B) toward outside) L2 of the second claw 36, and a width dimension (dimension along the webbing 20 width direction) W1 of the first claw 34 is set smaller than a width dimension (dimension along the webbing 20 width direction) W2 of the second claw 36.

In the outer peripheral portion 30B of the protector 30, a pair of a first contact portion 38A and a first contact portion 38B, having a substantially U plate shape, as contact portions are integrally provided, at the outer sides in the width direction of the protector 30 (in the vehicle front and rear direction of the protector 30) with respect to the first claw 34 and the second claw 36. The first contact portion 38A and the first contact portion 38B are provided extending from the side wall 32A side to the side wall 32B side and projected to the outer side from the protector 30. The first contact portion 38A and the first contact portion 38B are arranged on the side of a lower surface 25B (the surface on the side of the spool 20) of the body portion 25 of the stay 24 to be in abutting contact with the lower surface 25B.

In the outer peripheral portion 30B of the protector 30, a second contact portion 40A having a substantially rectangular plate shape as a contact portion is integrally provided, between the first claw 34 and the first contact portion 38A. The second contact portion 40A is projected to the outer side from the protector 30 and arranged on the side of the lower surface 25B of the body portion 25 of the stay 24 to be in abutting contact with the lower surface 25B. Accordingly, a notch portion 42A is provided between the first contact portion 38A and the second contact portion 40A and the notch portion 42A is arranged between the first claw 34 and an end on the outer side in the width direction (in the webbing 20 width direction) of the side wall 32A, so that the first contact portion 38A and the second contact portion 40A are separated. A projection dimension L3 of the second contact portion 40A is set larger than the projection dimension L1 of the first claw 34 and the projection dimension L2 of the second claw 36.

Further, in the outer peripheral portion 30B of the protector 30, a second contact portion 40B having a substantially rectangular plate shape as a contact portion is integrally provided, between the first claw 34 and the first contact portion 38B. The second contact portion 40B is projected to the outer side from the protector 30 and arranged on the side of the lower surface 25B of the body portion 25 of the stay 24 to be in abutting contact with the lower surface 25B. Accordingly, a notch portion 42B is provided between the first contact portion 38B and the second contact portion 40B and the notch portion 42B is arranged between the first claw 34 and an end on the outer side in the width direction (in the webbing 20 width direction) of the side wall 32A, so that the first contact portion 38B and the second contact portion 40B are separated. A projection dimension L4 of the second contact portion 40B is set equal to the projection dimension L3 of the second contact portion 40A.

As described above, the first contact portion 38A, the first contact portion 38B, the second contact portion 40A, and the second contact portion 40B are in abutting contact with the lower surface 25B. Thus, the upward (to the opposite side of the spool 20) movement of the protector 30 is restricted by the first contact portion 38A, the first contact portion 38B, the second contact portion 40A, and the second contact portion 40B. Moreover, the body portion 25 of the stay 24 is sandwiched between the first claw 34 and the second claw 36, and the first contact portion 38A, the first contact portion 38B, the second contact portion 40A, and the second contact portion 40B. Thus, the protector 30 is thereby held by the stay 24. Further, the sum total of the contact (abut) areas (the areas indicated by oblique lines in FIG. 5) of the first contact portion 38A, the first contact portion 38B, the second contact portion 40A, and the second contact portion 40B with the body portion 25 is set larger than the sum total of the contact (abut) areas (the areas indicated by oblique lines in FIG. 3) of the first claw 34 and the second claw 36 with the body portion 25 of the stay 24.

As shown in FIG. 1, a torsion shaft 50 (an element grasped as an "energy absorbing member" in a broad sense) constituting a force limiter mechanism is coaxially inserted through the spool 20. The torsion shaft 50 is formed in a substantially cylindrical shape and made of a metallic material, and includes a torsion deform portion 52 that can be torsion deformed by a torsion load which is equal to or more than a predetermined value being applied. One end 50A at the leg plate 12B side of the torsion shaft 50 is projected from one end face at the leg plate 12B side of the spool 20. The other end 50B at the leg plate 12C side of the torsion shaft 50 is, in relatively unrotatably manner, fixed to inside of the other end at the leg plate 12C side of the spool 20. Accordingly, it is structured that the torsion shaft 50 is configured to be rotatable integrally with the spool 20.

A lock gear 54 (an element grasped as a "rotating member" in a broad sense) having a substantially cylindrical shape is provided at one end of the spool 20. The torsion shaft 50 coaxially penetrations through the lock gear 54 and the torsion shaft 50 is relatively unrotatably fixed to the lock gear 54. Accordingly, it is structured that the lock gear 54 is integrally rotatable with the torsion shaft 50. The lock gear 54 also has ratchet teeth 54A (external teeth) formed on the entire outer circumference thereof.

A clutch recess 56 in a cylindrical shape constituting a clutch mechanism is formed on a surface of the lock gear 54, the surface being at the side opposite to the spool 20 side, and the coefficient of friction at the inner circumferential surface of the clutch recess 56 is set high.

An energizing (urging) mechanism (an element grasped as an "energizing (urging) unit" in a broad sense) (not shown in the drawings) is provided at the outer side of the leg plate 12C of the frame 12, and the energizing mechanism is connected to the spool 20 to cause an energizing (urging) force to act on the spool 20 in the winding direction.

A lock plate 58 (an element grasped as a "regulating member (lock member)" in a broad sense) is rotatably supported at the leg plate 12B of the frame 12 near the arrangement hole 14, and the lock plate 58 has lock teeth 58A formed thereon. The lock plate 58 is communicated with a lock mechanism (an element grasped as a "regulating unit (lock unit)" in a broad sense) (not shown in the drawings) and in an emergency of the vehicle (when the webbing 22 is abruptly pulled from the spool 20 or the vehicle is suddenly decelerated), the lock plate 58 is rotationally moved by the lock mechanism being actuated so that the lock teeth 58A are meshed (engaged) with the ratchet teeth 54A of the lock gear 54. Accordingly, the rotation of the lock gear 54 in the pulling direction is regulated (locked) to regulate the rotation of the spool 20 in the pulling direction (the rotation of the spool 20 in the winding direction is permitted).

A rack-and-pinion pretensioner mechanism 60 is provided at the outer side of the leg plate 12B of the frame 12.

The pretensioner mechanism 60 is provided with a gear case 62 having a substantially cylindrical shape and the gear case 62 is fixed to the leg plate 12B. The outer circumferential portion of the gear case 62 covers the outer circumferential portion of the lock gear 54 and the clutch recess 56 of the lock gear 54 is arranged inside the gear case 62 and the one end 50A of the torsion shaft 50 penetrates therethrough.

A predetermined number of hold pins (shear pins) (not shown in the drawings) having a cylindrical shape are integrally formed in the outer circumferential portion of the gear case 62 and the hold pins are projected to the opposite side of the lock gear 54 from the gear case 62. A catch (anchor) pin 64 (shear pin) having a cylindrical shape is integrally formed at an upper portion of the gear case 62 and the catch pin 64 is projected to the opposite side of the leg plate 12B from the gear case 62.

A clutch plate 66 having a substantially annular plate shape constituting the clutch mechanism is arranged on the opposite side of the lock gear 54 of the gear case 62. A predetermined number of semicircular mounting holes 68 are formed at outer peripheral edge portion of the clutch plate 66 and the predetermined number of mounting holes 68 are equidistantly arranged along the circumferential direction of the clutch plate 66. The hold pin of the gear case 62 described above is fitted into the mounting hole 68 and the clutch plate 66 is thereby held by the gear case 62.

A predetermined number (six in the present embodiment) of extension portions 70 having an L plate shape are integrally formed on the inner circumference of the clutch plate 66 and the predetermined number of extension portions 70 are equidistantly arranged along the circumferential direction of the clutch plate 66. A meshing portion 70A having a columnar shape is formed integrally at the tip of the extension portion 70 and the meshing portion 70A is projected to the side of the gear case 62 from the extension portion 70 and inserted into the clutch recess 56 of the lock gear 54 via the inner side of the gear case 62. The meshing portion 70A is spaced apart from the circumferential surface of the clutch recess 56 and the clutch plate 66 permits the rotation of the lock gear 54.

A pinion 72 is provided at the inner circumferential side of the clutch plate 66, and at the pinion 72, the one end 50A of the torsion shaft 50 is penetrated therethrough coaxially and relatively rotatably. A gear 74 is provided in the intermediate portion in the axial direction of the pinion 72 and pinion teeth 74A are formed on the entire outer circumference of the gear 74. Further, a rotating pivot (support shaft) portion 76 having a cylindrical shape is coaxially formed in a portion of the pinion 72 on the opposite side of the lock gear 54.

A clutch portion 78 constituting the clutch mechanism is formed in a portion on the side of the lock gear 54 of the pinion 72, and the clutch portion 78 is inserted into the clutch recess 56 of the lock gear 54. A predetermined number (six in the present embodiment) of heights (convex portions) 78A are formed on the outer circumferential surface of the clutch portion 78 and the predetermined number of the heights 78A are equidistantly arranged along the circumferential direction of the clutch portion 78 and the respective projection heights of the heights 78A are gradually increased as going in the pulling direction. In the clutch portion 78, the meshing portion 70A of the clutch plate 66 is attached (press abutted) to a winding direction side portion of each height 78A and the pinion 72 is thereby held by the clutch plate 66.

A cover plate 80 is provided at the outer side of the leg plate 12B of the frame 12 and the cover plate 80 is fixed (fastened) to the leg plate 12B by plural fixing screws 82. The cover plate 80 covers the gear case 62, the clutch plate 66, and the pinion 72 from the opposite side of the lock gear 54.

The cover plate 80 has a circular hole 80A having a circular sectional shape formed by being penetrated therethrough and the rotating pivot portion 76 penetrates through the circular hole 80A. A K-ring 84 having a substantially C shape in a front view is fitted and fixed to the tip portion of the rotating pivot portion 76, and the removal of the pinion 72 from the cover plate 80 is regulated by the K-ring 84 being caught (anchored) to the cover plate 80. Accordingly, the cover plate 80 freely rotatably supports the pinion 72 in the circular hole 80A.

A cylinder 90 having an annular shape is provided between an upper part of the leg plate 12B of the frame 12 and the upper part of the cover plate 80, and the cylinder 90 is extended upward from the leg plate 12B and the cover plate 80.

The cylinder 90 is fitted into a cylinder holder 92 having a substantially U plate sectional shape at an upper side of the cover plate 80, and the cylinder holder 92 is engaged with the upper part of the leg plate 12B in both end portions in the longitudinal direction thereof and fixed to the leg plate 12B. Accordingly, the cylinder holder 92 restricts the movement of the cylinder 90 in the radial direction so as to hold the cylinder 90.

A gas generator 94 having a substantially cylindrical shape as a drive unit is fitted and fixed to an upper end inside the cylinder 90 and the gas generator 94 closes the upper end of the cylinder 90.

The gas generator 94 is electrically connected to a control device (not shown in the drawings) of the vehicle. In an emergency of the vehicle (when a collision of the vehicle occurs (when a collision of the vehicle is detected)), a high-pressure gas is generated instantly by the gas generator 94, by the pretensioner mechanism 60 being actuated under the control of the control device, to supply the gas to the upper end of the cylinder 90.

A piston 96 is provided inside the cylinder 90. A base portion 98 having a cylindrical shape is provided at the upper end of the piston 96 and the base portion 98 is arranged coaxially with the cylinder 90. The piston 96 is provided with a contact portion 100 having a disc plate shape immediately below the base portion 98, and the contact portion 100 is arranged coaxially with the cylinder 90 and projected from the entire outer circumference of the base portion 98 and substantially fitted to the inner circumferential surface of the cylinder 90.

An X-ring 102 having an annular shape and an X sectional shape as a seal member is arranged on the outer circumference of the base portion 98 and the X-ring 102 is made of rubber or the like and has elasticity and sealing properties. The X-ring 102 is in contact with, in the entire circumference (all-round), the outer circumferential surface of the base 98, the upper surface of the contact portion 100, and the inner circumferential surface of the cylinder 90 in a state of elastic deformation, and the X-ring 102 seals between the cylinder 90 and the piston 96.

The piston 96 is provided with a rack 104 in a substantially rectangular columnar shape at a portion below the contact portion 100, and rack teeth 104A are formed in a portion of the rack 104 at the side opposite to the back plate 12A side. The rack 104 is projected from a lower end of the cylinder 90 and the rack teeth 104A is caught by the catch 64 of the gear case 62, the lower end of the rack 104 is arranged in an upper-side neighborhood of the gear 74 of the pinion 72.

Next, the operation of the present embodiment will be described.

In the webbing winding device 10 configured as described above, when the webbing 22 is worn by the occupant who has taken the seat in the vehicle, looseness of the webbing 22 is removed by the energizing force in the winding direction being caused by the energizing mechanism to act on the spool 20.

In an emergency of the vehicle (when the webbing 22 is abruptly pulled from the spool 20 or the vehicle is suddenly decelerated), the lock teeth 58A of the lock plate 58 are meshed with the ratchet teeth 54A of the lock gear 54 by the lock mechanism being actuated. Accordingly, the rotation of the lock gear 54 in the pulling direction is regulated and with the rotation of the spool 20 in the pulling direction being regulated, pulling of the webbing 22 from the spool 20 is regulated.

When pulling of the webbing 22 from the spool 20 is regulated, a torsion load is applied to the torsion shaft 50 via the webbing 22 and the spool 20 due to energy of inertia of the vehicle occupant. If the torsion load is equal to or more than a predetermined value, the torsion deformed portion 52 of the torsion shaft 50 is torsion-deformed (the force limiter mechanism is actuated) and the spool 20 relatively rotates in the pulling direction with respect to the lock gear 54. Accordingly, the webbing 22 is pulled out so as to absorb the load (energy) acting on the vehicle occupant from the webbing 22.

Figure 7A:
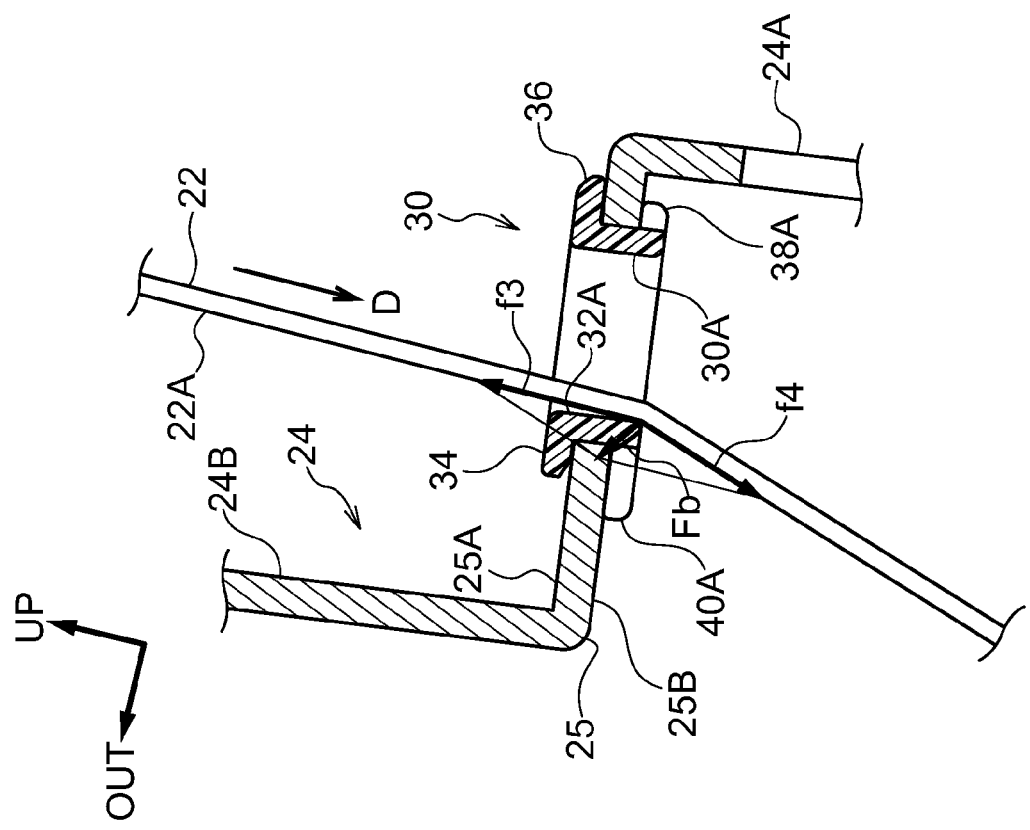
FIG. 7A is a conceptual diagram showing a pressing force acting on the protector when a force limiter mechanism provided in the webbing winding device shown in FIG. 1 is actuated and FIG. 7B is a conceptual diagram showing the pressing force acting on the protector when a pretensioner mechanism provided in the webbing winding device is actuated.
Figure 8A:
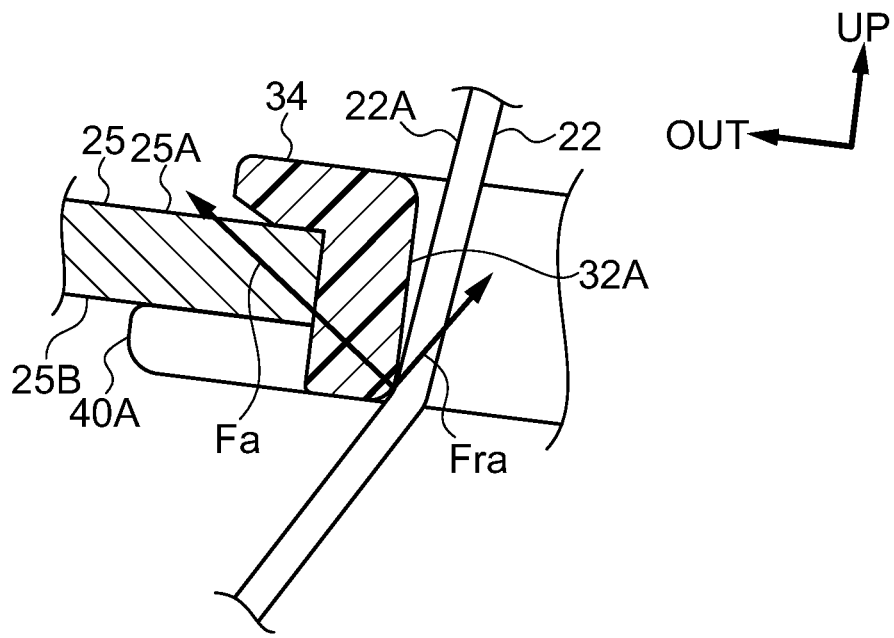
FIG. 8A is a conceptual diagram showing a frictional force acting on the protector when the force limiter mechanism provided in the webbing winding device shown in FIG. 1 is actuated and FIG. 8B is a conceptual diagram showing the pressing force acting on the protector when the pretensioner mechanism provided in the webbing winding device is actuated.

At this time, a tension force of about 4 kN to 7 kN acts on the webbing 22. Also, with the webbing 22 being pulled in the pulling direction and the webbing 22 being in abutting contact with the side wall 32A of the protector 30, a tension force f1 of the webbing 22 in the direction in which the webbing 22 is extended from the side wall 32A and a tension force f2 of the webbing 22 in the direction from the side wall 32A toward the spool 20 act on the side wall 32A of the protector 30, due to tension force acting on the webbing 22. Thus, a resultant force Fa of the tension f1 and the tension f2 acts on the side wall 32A toward obliquely upward on the outer side in the vehicle width direction as a pressing (pushing) force (see FIG. 7A). Further, the webbing 22 moves upward (the direction toward the side opposite to the spool 20 side, that is, the direction indicated by an arrow C shown in FIG. 7A) while sliding on the side wall 32A of the protector 30. Thus, with the coefficient of friction between the protector 30 and the webbing 22 being set as μ, a frictional force Fra=(μ×Fa) acts on the side wall 32A of the protector 30 (see FIG. 8A).

Further, in an emergency of the vehicle (when a collision of the vehicle occurs (when a collision of the vehicle is detected)), a high-pressure gas is generated instantly by the gas generator 94, by the pretensioner mechanism 60 is actuated under the control of the control device, to supply the gas to the upper end of the cylinder 90. Thus, while the state in which the cylinder 90 and the piston 96 is sealed by the X-ring 102 is maintained, with pressure of the gas being received by the piston 96 and the X-ring 102 from the upper side, the catch pin 64 of the gear case 62 that catches the rack 104 (the rack teeth 104A) of the piston 96 is broken by the rack teeth 104A, and the piston 96 and the X-ring 102 are moved downward. Accordingly, the rack 104 (the rack teeth 104A) of the piston 96 is engaged with the gear 74 (the pinion teeth 74A) of the pinion 72, and the pinion 72 is rotated in the winding direction.

At a time in which the pinion 72 is rotated in the winding direction, with the meshing portion 70A of the clutch plate 66 being moved from a portion of the height 78A at the side of the winding direction in the clutch portion 78 of the pinion 72 to a portion of the height 78A at the side of the pulling direction, the meshing portion 70A is moved to the outer circumferential surface side of the clutch recess 56 of the lock gear 54 while the extension portion 70 of the clutch plate 66 is deformed and moved to the outer circumferential side of the clutch plate 66. Thus, with the meshing portion 70A being meshed (engaged) between the clutch portion 78 (the circumferential surface of the height 78A) and the lock gear 54 (the circumferential surface of the clutch recess 56), so the pinion 72, the clutch plate 66, the lock gear 54, the torsion shaft 50, and the spool 20 are made integrally rotatable. Accordingly, with the hold pin of the gear case 62 fitted into the mounting hole 68 of the clutch plate 66 being broken by the periphery edge of the mounting hole 68 and holding of the clutch plate 66 to the gear case 62 being released, the pinion 72, the clutch plate 66, the lock gear 54, the torsion shaft 50, and the spool 20 are integrally rotated in the winding direction. Thus, the webbing 22 is wound by the spool 20, increasing the force of constraint of the vehicle occupant by the webbing 22.

Figure 7B:
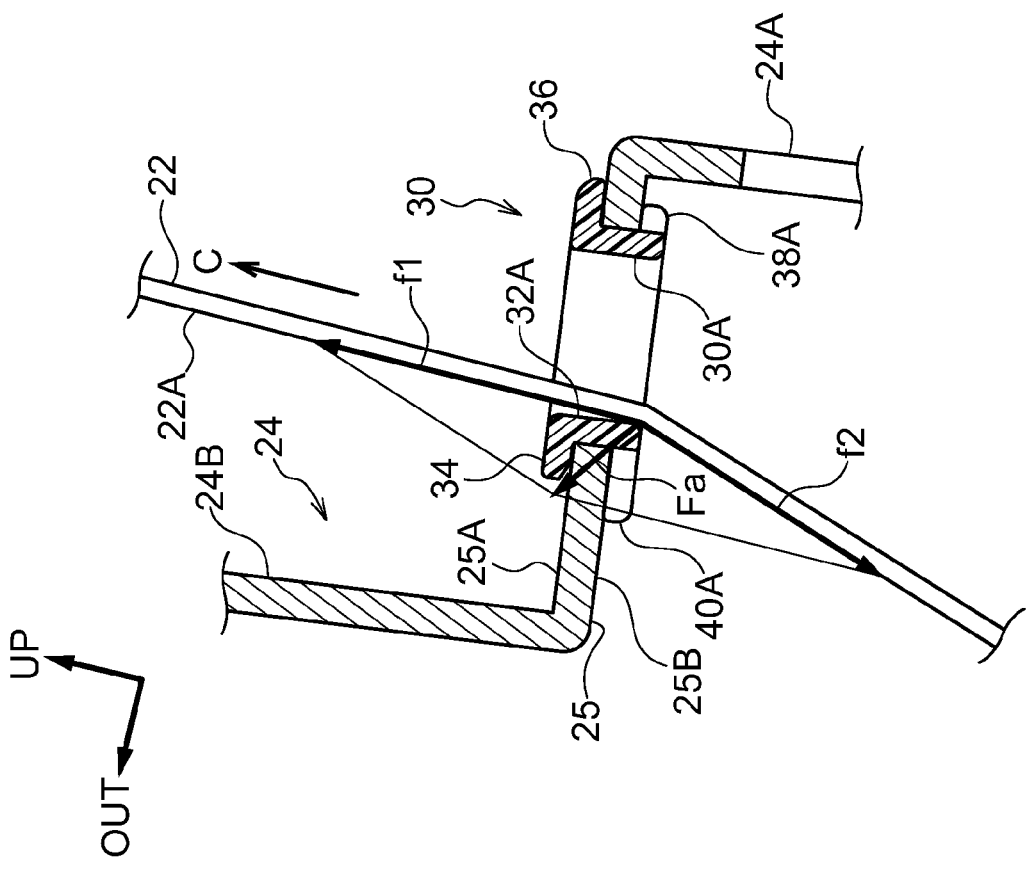
Figure 8B:
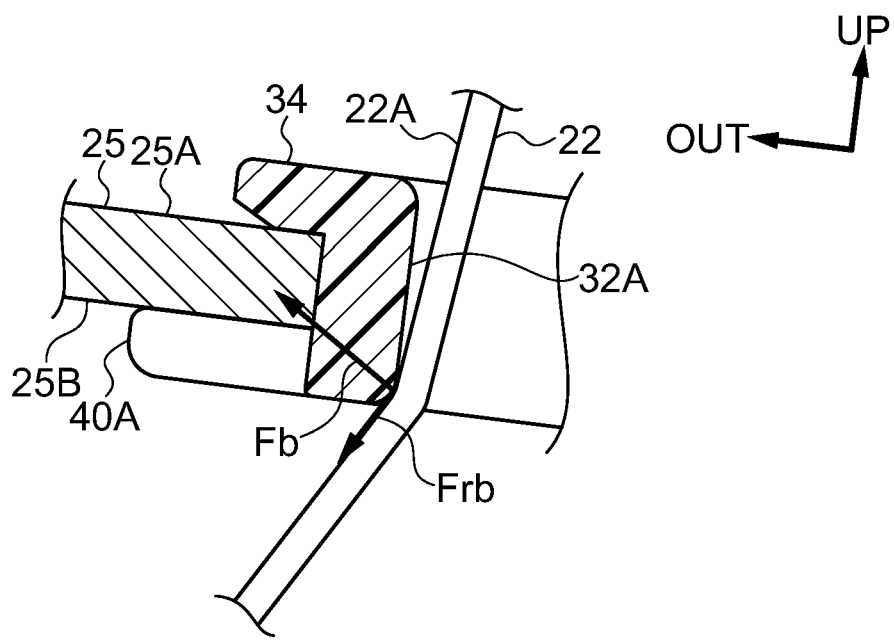

At this time, a tension force of about 3 kN acts on the webbing 22. Also with the webbing 22 being wound by the spool 20 and the webbing 20 being in abutting contact with the side wall 32A of the protector 30, a tension force f3 of the webbing 22 in the direction in which the webbing 22 is extended from the side wall 32A and a tension force f4 of the webbing 22 in the direction from the side wall 32A to the spool 20 act on the side wall 32A of the protector 30 due to a tension force acting on the webbing 22. Thus, a resultant force Fb of the tension f3 and the tension f4 acts on the side wall 32A toward obliquely upward on the outer side in the vehicle width direction as a pressing (pushing) force (see FIG. 7B). Further, the webbing 22 moves downward (the direction toward the side of the spool 20, that is, the direction indicated by an arrow D shown in FIG. 7B) while sliding on the side wall 32A of the protector 30. Thus, with the coefficient of friction between the protector 30 and the webbing 22 being set as μ, a frictional force Frb=(μ×Fb) acts on the side wall 32A of the protector 30 (see FIG. 8B).

Since, as described above, a tension force acting on the webbing 22 when the force limiter mechanism is actuated is larger than a tension force acting on the webbing 22 when the pretensioner mechanism 60 is actuated, the resultant force Fa becomes larger than the resultant force Fb and the frictional force Fra becomes larger than the frictional force Frb. Accordingly, upward movement of the protector 30 due to the frictional force Fra is restricted by regions of the first contact portion 38A, the first contact portion 38B, the second contact portion 40A, and the second contact portion 40B, having a larger contact area with the body portion 25 than the contact area of the first claw 34 and the second claw 36 with the body portion 25 and thus, the stay 24 (the insertion hole 26) can be caused to effectively hold the protector 30. Further, the projection dimension L1 and the projection dimension L2 can be set smaller than the projection dimension L3 and the projection dimension L4.

The sum total of the contact (abut) areas (the areas indicated by oblique lines in FIG. 5) of the first contact portion 38A, the first contact portion 38B, the second contact portion 40A, and the second contact portion 40B with the body portion 25 is set larger than the sum total of the contact (abut) areas (the areas indicated by oblique lines in FIG. 3) of the first claw 34 and the second claw 36.

Accordingly, at a time in which the protector 30 is attached to the stay 24 (the insertion hole 26), the first claw 34 and the second claw 36 having a smaller contact area (small sum total contact area) to the stay 24 are caused to insert through the insertion hole 26 from the lower side of the stay 24 (side of the spool 20). At this time, the protector 30 is elastically deformed with the projecting amount of the first claw 34 and the second claw 36, but as described above, the projection dimension L1 of the first claw 34 and the projection dimension L2 of the second claw 36 can be made smaller and thus, the amount of deflection (flexure) of the protector 30 can be made smaller when the protector 30 is elastically deformed. Therefore, the stay 24 (the insertion hole 26) can reliably be caused to hold the protector 30, and the protector 30 can be attached to the stay 24 easily.

The side wall 32A is provided with the first claw 34 and the side wall 32B is provided with the second claw 36. Thus, when the protector 30 is attached to the stay 24, the body portion 25 of the stay 24 is inserted between the second claw 36, and the first contact portion 38A and the first contact portion 38B to engage the side wall 32B with an edge portion of the insertion hole 26 and thereafter, only the side wall 32A part is elastically deformed so that the protector 30 can be attached to the stay 24.

The projection dimension L1 of the first claw 34 is set smaller than the projection dimension L2 of the second claw 36 and the width dimension W1 of the first claw 34 is set smaller than the width dimension W2 of the second claw 36. Thus, the side wall 32A may be deflected for the projection dimension L1 and the width dimension W1 of the first claw 34, so the load needed to deflect (flex-deform) the side wall 32A part can be set smaller than the load needed to deflect the side wall 32B part. Accordingly, the protector 30 can be made further easier to be attached to the stay 24.

Moreover, the side wall 32A is arranged in such a way that the length of the webbing 22 extended from the spool 20 to the side wall 32A becomes shorter than the length of the webbing 22 extended from the spool 20 to the side wall 32B. Thus, the webbing 22 extended from the spool 20 mainly slides on the side wall 32A. When the webbing 22 slides on the side wall 32A, the pressing force Fa and the pressing force Fb acting on the protector 30 by the webbing 22 act in the outer side direction of the protector 30 as well. Therefore, in the side wall 32A which is elastically deformed when the protector 30 is attached to the stay 24, the protector 30 can be held by the stay 24 (the insertion hole 26) more effectively.

Further, the notch portion 42A is provided between the first contact portion 38A and the second contact portion 40A and the notch portion 42B is provided between the first contact portion 38B and the second contact portion 40B. Thus, the first contact portion 38A and the second contact portion 40A are separated and the first contact portion 38B and the second contact portion 40B are separated. Accordingly, the side wall 32A of the protector 30 can be elastically deformed more easily in regions of the notch portion 42A and the notch portion 42B to allow the protector 30 to be attached to the stay 24 effectively.

Incidentally, the stay 24 and the frame 12 are constructed from separate members in the present embodiment and the stay 24 is fixed to the frame 12. Instead, the stay 24 and the frame 12 may integrally be formed.

In the present embodiment, the projection dimension L1 of the first claw 34 is set smaller than the projection dimension L2 of the second claw 36 and the width dimension W1 of the first claw 34 is set smaller than the width dimension W2 of the second claw 36. Instead, the projection dimension L2 of the second claw 36 may be set smaller than the projection dimension L1 of the first claw 34 with the width dimension W1 of the first claw 34 being set smaller than the width dimension W2 of the second claw 36. Also in this case, the width dimension W1 of the first claw 34 is set smaller than the width dimension W2 of the second claw 36 and thus, the load used to deflect (flex) the side wall 32A can be made easier to set smaller than the load used to deflect the side wall 32B by setting the width dimension W1 of the first claw 34.

Further, in the present embodiment, the projection dimension L1 of the first claw 34 is set smaller than the projection dimension L2 of the second claw 36 and the width dimension W1 of the first claw 34 is set smaller than the width dimension W2 of the second claw 36. Instead, the projection dimension L1 of the first claw 34 is set smaller than the projection dimension L2 of the second claw 36 with the width dimension W2 of the second claw 36 may be set smaller than the width dimension W1 of the first claw 34. Also in this case, the projection dimension L1 of the first claw 34 is set smaller than the projection dimension L2 of the second claw 36 and thus, the load used to deflect the side wall 32A can be made easier to set smaller than the load used to deflect the side wall 32B by setting the projection dimension L1 of the first claw 34.

What is claimed is:

1. A webbing winding device, comprising:
a winding shaft that winds a webbing worn by an occupant of a vehicle by being rotated in a winding direction and that is rotated in a pulling-out direction by the webbing being pulled out;
a frame that supports both ends of the winding shaft;
a regulating member that regulates rotation of the winding shaft in the pulling-out direction during an emergency condition of the vehicle;
a force limiter mechanism that is provided to be rotatable integrally with the winding shaft, the force limiter mechanism permitting rotation of the winding shaft in the pulling-out direction by being torsion deformed when rotation of the winding shaft in the pulling-out direction is regulated by the regulating member;
an insertion portion provided in the frame, at which an insertion hole is formed through which the webbing extended from the winding shaft is inserted;
a protector in which the webbing is inserted having an elongated ring shape, which is mounted on the insertion portion after being elastically deformed, the protector covering an inner circumferential portion of the insertion hole to protect the webbing, and the webbing sliding on the protector when the webbing is wound or pulled out;
a claw portion which is provided at an outer circumferential portion of the protector and which projects toward an outer side with respect to the protector, the claw portion abutting on a surface of the insertion portion at a side opposite to a winding shaft side; and
a contact portion in opposition to the claw portion which is provided at the outer circumferential portion of the protector and which projects toward the outer side with respect to the protector, the contact portion abutting on a surface of the insertion portion at the winding shaft side;
wherein, when the force limiter mechanism permits rotating of the winding shaft in the pulling-out direction, the webbing is pulled through the protector in a direction from the contact portion side toward the claw portion side, and
wherein an entire abutting area of the contact portion with the insertion portion is larger than an entire abutting area of the claw portion with the insertion portion.

2. The webbing winding device of claim 1, wherein
the protector includes a one side wall over which one side surface in a thickness direction of the webbing extending from the winding shaft is slid and another side wall on which another side surface in the thickness direction of the webbing extending from the winding shaft is slid,
the one side wall is being arranged such that a length of the webbing extending from the winding shaft to the one side wall is shorter than the length of the webbing extending from the winding shaft to the other side wall,
the claw portion including a first claw portion provided in the one side wall and a second claw portion provided in the other side wall, and
the first claw portion and the second claw portion are configured to have at least one of:
a projecting dimension of the first claw portion being smaller than a projecting dimension of the second claw portion; or
a width dimension of the first claw portion being smaller than a width dimension of the second claw portion.

3. The webbing winding device of claim 1, further comprising a notch portion provided in a one side wall of the protector, the notch portion being arranged between the claw portion and an end portion of the one side wall in a width direction to divide the contact portion.

4. The webbing winding device of claim 2, further comprising a notch portion provided in the one side wall, the notch portion being arranged between the claw portion and an end portion of the one side wall in a width direction to divide the contact portion.

* * * * *